United States Patent [19]
Schroer et al.

[11] Patent Number: 4,902,320
[45] Date of Patent: Feb. 20, 1990

[54] BOTTLED WATER COOLER AIR FILTER

[75] Inventors: William L. Schroer, Freeport; Kraig S. Kniss, Lanark, both of Ill.

[73] Assignee: Elkay Manufacturing Company, Oak Brook, Ill.

[21] Appl. No.: 310,234

[22] Filed: Feb. 13, 1989

Related U.S. Application Data

[62] Division of Ser. No. 115,813, Nov. 2, 1987, Pat. No. 4,834,267.

[51] Int. Cl.⁴ ................ B01D 50/00
[52] U.S. Cl. ................ 55/385.1; 55/420; 55/502; 55/507; 222/185
[58] Field of Search ................ 55/385.1, 418, 420, 55/502, 507; 141/39, 40; 222/181, 185, 189

[56] References Cited

U.S. PATENT DOCUMENTS

| | | | |
|---|---|---|---|
| 778,012 | 12/1904 | Conover | 62/317 |
| 1,658,227 | 2/1928 | Davis, Jr. | 222/185 |
| 3,974,863 | 8/1976 | Frahm et al. | 222/185 |
| 4,303,514 | 12/1981 | Theorell | 210/136 |

*Primary Examiner*—Bernard Nozick
*Attorney, Agent, or Firm*—Leydig, Voit & Mayer

[57] ABSTRACT

A bottled water cooler has a bottle inverted into a cooling reservoir, and a double lipped gasket seals the bottle to the reservoir. Air is admitted, to permit water flow, through a conduit ending in a housing. The housing supports a removable, and replaceable, filter element carrying an extremely fine porosity filter medium. A check valve in the housing blocks the conduit unless the filter element is in place. The housing and conduit is mounted on the cooler cabinet in a shielded, but conveniently accessible, location.

10 Claims, 2 Drawing Sheets

FIG. 1
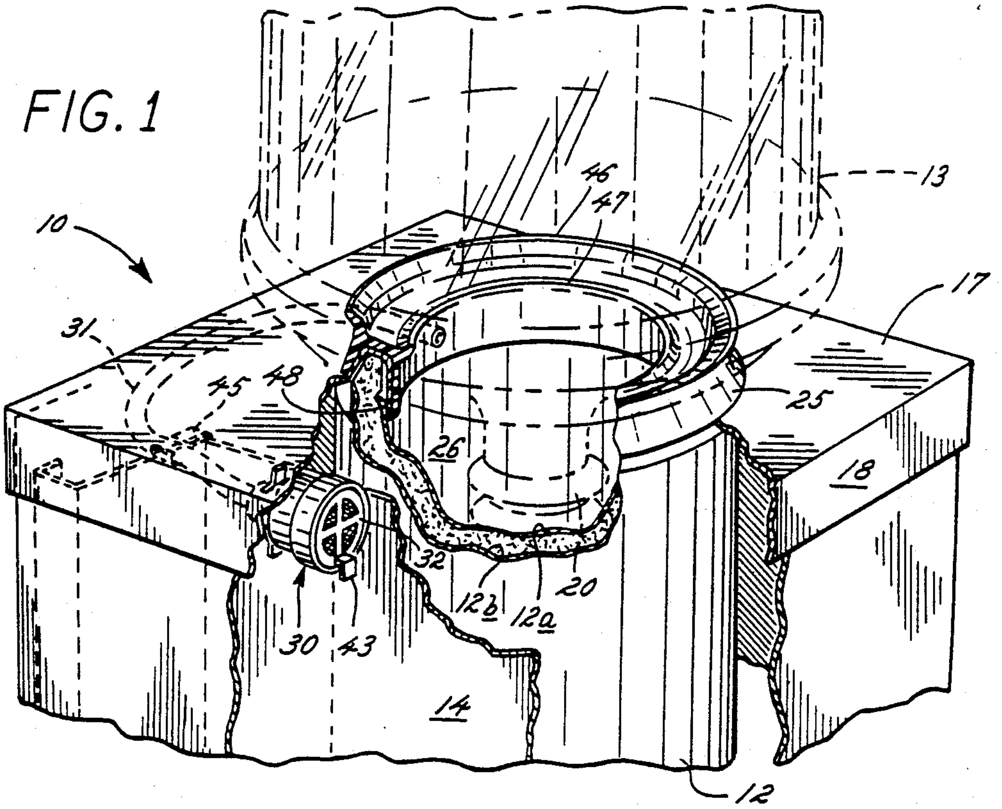
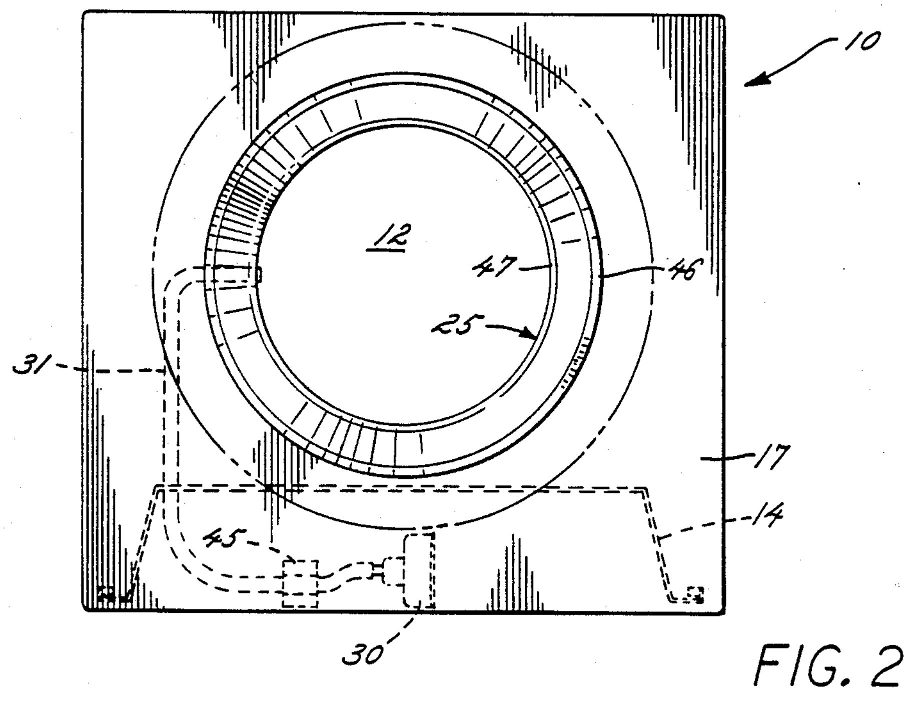
FIG. 2

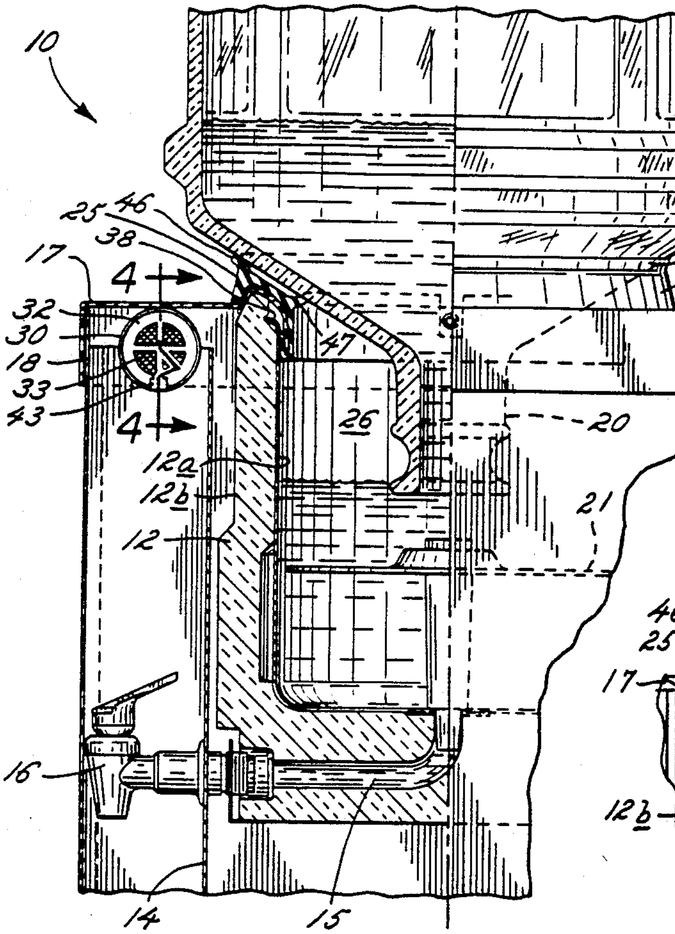
FIG. 3
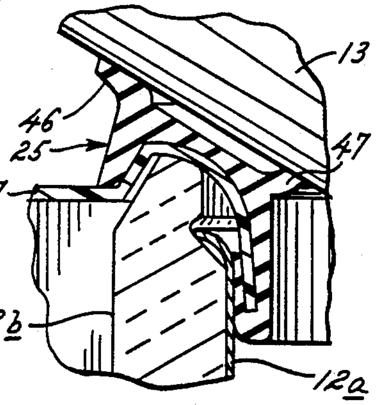
FIG. 5
FIG. 4A
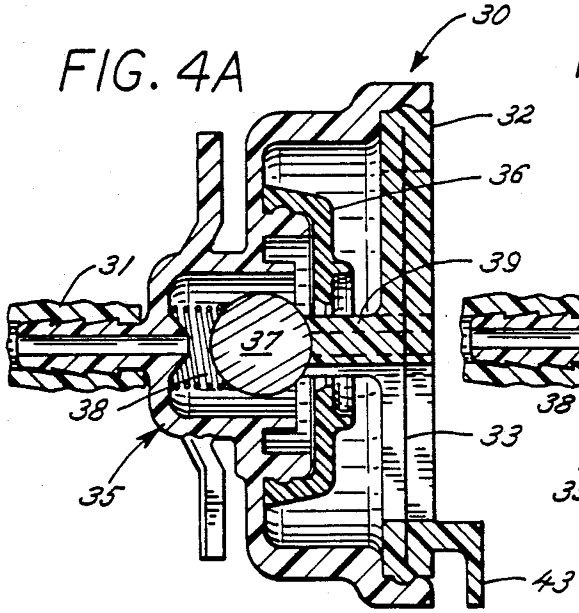
FIG. 4B
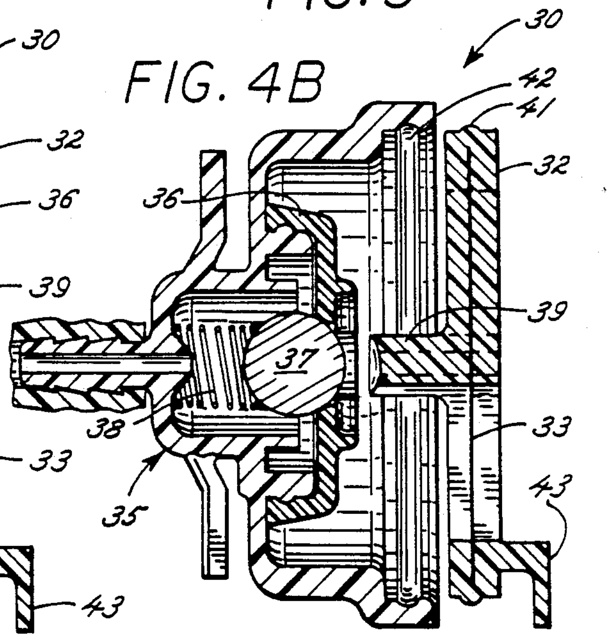

BOTTLED WATER COOLER AIR FILTER

This is a division of application Ser. No. 115,813, filed Nov. 2, 1987 now U.S. Pat. No. 4,834,267.

FIELD OF THE INVENTION

This invention relates generally to bottled water coolers and dispensers, and more particularly concerns an air filter system for such coolers and dispensers.

BACKGROUND OF THE INVENTION

A cooler and dispenser for bottled water normally has a cooling reservoir within which the inverted neck of a water bottle is held. Water flows from the bottle until the water level closes the bottle neck, and a refrigerating system cools the reservoir and the water being held there. Water is dispensed by draining the reservoir, usually through a faucet, and when the water level clears the inverted bottle neck, air in the reservoir can enter the bottle, bubble to the top, and release more water to maintain the water level in the cooling reservoir.

In conventional devices of this kind, the air containing upper portion of the cooling reservoir is in open contact with the ambient air conditions surrounding the cooler, and it is that air which bubbles into the bottle as water is dispensed. This air can carry dust, bacteria and other contaminants. Moreover, leaving the upper portion of the cooling reservoir open permits the undesirable entry of dirt, insects, etc.

One approach to keep bottled water clear, although in a somewhat different type of cooler than that so far discussed, is shown in U.S. Pat. No. 3,333,741, issued Aug. 1, 1967, which discloses placing a plastic foam filter in the water bottle neck so that entering air is filtered through the foam. More recently, the owner of that patent commercially marketed an inverted bottle water cooler having a gasket in the open top of the cooling reservoir that seals against the inverted water bottle, thus closing the reservoir. Air is admitted to the cooling reservoir through foam filter portions of the gasket assembly. This arrangement limits the filtering effectiveness to that obtainable with relatively large foam blocks, and exposes the cooling reservoir to contaminants falling from the gasket-filter element assembly when that assembly is disturbed—as when changing filter elements.

OBJECTS OF THE INVENTION

It is the primary aim of the present invention to better protect the water in a bottled water cooler by more efficiently and completely filtering the air entering a sealed cooling reservoir and the water bottle. A related object of the invention is to provide an air filtering system for such coolers that economically permits the use of highly efficient filtering materials such as those used for surgical masks.

Another object is to provide an air filtering system as characterized above that automatically and positively seals the cooling reservoir if the filter element is not in operative position, as when a filter element is being changed. A collateral object is to provide an air filtering system of the foregoing kind that affords easy replacement of the filter element. A further object is to provide such a filtering system that gives a reliable indication of a need for filter replacement.

It is also an object of the invention to provide an air filtering system that can be readily and economically retrofitted on existing bottled water coolers, and, if desired, associated with other forms of liquid dispensing structures that require drawing in air to permit liquid flow.

SUMMARY OF THE INVENTION

Air is filtered to the cooling reservoir of a bottled water cooler by sealing that area with a gasket fitted between the upper, normally open end of the reservoir and the inverted top of a water bottle, and then providing air access through a conduit ending in a housing. The housing admits air to the conduit through a filter medium of extremely fine porosity such as surgical gauze. A check valve is biased closed to block air flow from the housing to the conduit. The filter medium is carried by a filter element that can be removably snapped into the housing. The element includes a portion to engage and open the check valve when the element is in position.

BRIEF DESCRIPTION OF THE DRAWINGS

Other objects and advantages of the invention will become apparent upon reading the following detailed description and upon reference to the drawings, in which:

FIG. 1 is a fragmentary perspective of the top portion of a water cooler, with portions broken away in section, that embodies the invention;

FIG. 2 is a top plan of the cooler shown in FIG. 1;

FIG. 3 is a vertical section and elevation of the portion of the cooler shown in FIG. 1 with a water bottle in position;

FIGS. 4A and 4B are sections taken approximately along the line 4—4 in FIG. 3 showing alternate positions of that structure; and FIG. 5 is an enlarged fragmentary portion of the upper left-hand section in FIG. 3 showing the gasket sealing between the bottle, the cooler cover and the reservoir.

DETAILED DESCRIPTION OF THE PREFERRED EMBODIMENT

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning to the drawings, there is shown a bottled water cooler 10 of the type having, in a cabinet 11, an open-topped cooling reservoir 12 into which is fitted the inverted top of a bottle 13 containing water. Typically, the reservoir 12 includes an inner metal shell **12*a* surrounded by an outer shell 12*b* of insulating material, as shown in FIGS. 1, 3 and 5, and the metal shell 12*a* is cooled by a refrigeration system, not shown, in the lower portion of the cabinet 11. Water is taken from the reservoir through a drain pipe 15 and a faucet 16 mounted on a cabinet front panel 14. In the illustrated cooler 10, the front panel 14 is recessed within the cabinet periphery so as to set the faucet 16 back into the cabinet and thus prevent inadvertent contact. The cabinet 11 is closed by a cover 17 having a depending flange 18** and a center opening defined by a downwardly extending annular skirt 19 registering with the cooling reservoir 12.

When the typical bottle of water 13 is inverted into the reservoir 12, water spills from the open bottle neck 20 and fills the reservoir 12 until the water level reaches the bottle neck. This blocks air from entering the bottle, and atmospheric pressure prevents further water flow. In the illustrated cooler 10, a baffle plate 21 is fitted in the cooling reservoir to help control initial splashing. When water is drawn at the nozzle 16, the water level in the reservoir drops, exposing the then open neck 20 of the bottle to air within the upper portion of the reservoir, and air bubbles rise to the top of the bottle releasing more water until the rising water level cuts off the air flow into the bottle neck.

In accordance with the invention, a gasket 25 mounted on the cover 17 air-seals the bottle 13 to the top of the reservoir 12 to define an air sealed region 26, a housing 30 is secured to the cabinet 11, a conduit 31 connects the interior of the housing 30 to the region 26 through the gasket 25, and a filter element 32 carrying a filter medium 33 is removably fitted on the housing to form a wall to the interior of the housing. In this way, air can reach the region 26 only through the filter medium 33, and thus only filtered air can reach the water being cooled and dispensed once the bottle 13 is in place. The housing 30 also encloses a normally closed valve 35 for sealing the conduit 31 from the interior of the housing 30, and the filter element 32 is formed to hold the valve 35 open when that filter element is in place.

In the preferred embodiment, the valve 35 is in the form of a common check valve, including a valve seat 36, a ball 37, and biasing spring 38. The filter element 32 has a projection 39 to engage and unseat the ball 37 when the element 32 is in place, which, as shown, means that a surrounding rib 41 on the circular filter element 32 has been snap fitted into an annular groove 42 in the substantially cylindrical housing 30. To permit this snap fitting, the housing 30 is formed of somewhat resilient plastic to allow the required deformation. A tab 43 is formed integrally on the element 32, also preferably molded of plastic, to facilitate removal for replacement.

The filter medium is preferably surgical gauze having extremely fine porosity, on the order of one micron, which typically is made of non-woven plastic fiber on a very thin film. While relatively expensive, only a small amount of such a filter medium is needed in this application. In use, this material is said to develop a static charge as a result of air flow which forms one barrier in the form of static attraction, and then a second barrier is the fine, one micron, porosity of the filter medium. One feature flowing from the use of this filtering material is that after extended use, perhaps one year or more in normal use in a normal environment, when the filter finally fills, it reaches that condition rather quickly. Going from an air flowing condition to an air blocking condition signals the user to replace the filter by stopping the water flow.

The valve 35 protects the water during filter replacement and, more importantly, by preventing use of the cooler if the filter is not properly installed or not installed at all.

A further feature is to locate the housing 30 under the front flange of the cover 17, where it can be conveniently reached for servicing and yet is out of sight to minimize unauthorized or curiosity provoked tampering. In the illustrated construction, the housing is mounted by mounting a clip 45 on the underside of the cover 17 which engages and holds the conduit 31 onto which the housing 30 is fitted.

Another feature of the invention is to mount the resilient gasket 25 on the cover 17 so that it . sealingly engages the upper portion of the cooling reservoir, and to form the gasket with double annular lips 46 and 47 to provide a more reliable double seal against the bottle 13. As shown in FIGS. 3 and 5, the lower edge of the gasket 25 has a third lip 48- to help insure sealing between the downwardly extending skirt 19 of the cover 17 and the upper end of the metal shell 12*a* of the cooling reservoir 12.

It should be noted that the gasket 25, filter and valve housing 30, and conduit 31 are all carried by the cover 17, which simply fits over the bottle cooler cabinet 11. Such a cover assembly thus permits convenient and economical retrofitting of existing bottled water coolers having the same cabinet shape. Obviously, for other standard cooler cabinet shapes, the proportions of the cover 17 can be readily adapted and a similar efficient retrofitting replacement effected.

We claim as our invention:

1. An air filtering system for permitting clean air intake to an otherwise air sealed region comprising, in combination, a gasket forming a portion of what defines said air sealed region, a valve and filter housing, a conduit connecting the interior of said housing to and through said gasket for transmitting air from the housing to said region, a filter element carrying a filter medium removably fitted on said housing so as to otherwise close the interior of the housing except for said conduit, a normally closed valve in said housing for sealing said conduit from the interior of said housing, and means on said filter element for opening said valve when the element is fitted on said housing, whereby air can pass through said filter medium, through said conduit and into said region, said valve being closed when the filter element is removed from the housing.

2. The combination of claim 1 in which said valve is a check valve including a ball, a seat and a spring for normally biasing said ball against said seat, and said opening means is a projection that unseats said ball from said seat when the filter element is in place.

3. The combination of claim 1 in which said filter medium is a panel of surgical gauze having pores on the order of one micron.

4. The combination of claim 1 in which said filter element is a disc snap fitted into a groove on said housing, said element having a tab for conveniently removing the element from its snap fit.

5. The combination of claim 1 in which said conduit includes at least a portion thereof rigidly affixed to said housing and communicating with the interior thereof.

6. The combination of claim 5 in which said conduit includes a flexible portion interconnecting said rigid portion and said gasket for transmitting air from the housing to said region.

7. An air filtering system for permitting clean air intake to an otherwise air sealed region comprising, in combination, sealing means for closing said air sealed region including a gasket forming a portion of what defines said air sealed region, a valve and filter housing, a conduit connecting the interior of said housing to and through said sealing means for transmitting air from the housing to said region, a filter element carrying a filter medium removably fitted on said housing so as to otherwise close the interior of the housing except for said conduit, a normally closed valve in said housing for sealing said conduit from the interior of said housing, and means on said filter element for opening said valve when the element is fitted on said housing, whereby air can pass through said filter medium, through said conduit and into said region, said valve being closed when the filter element is removed from the housing.

8. The combination of claim 7 in which said conduit includes at least a portion thereof rigidly affixed to said housing and communicating with the interior thereof.

9. The combination of claim 8 including flexible means for interconnecting said rigid portion and said sealing means for transmitting air from the housing to said region.

10. The combination of claim 7 in which said valve is a check valve including a ball, a seat and a spring for normally biasing said ball against said seat, and said opening means is a projection that unseats said ball from said seat when the filter element is in place.

* * * * *